United States Patent
Honka (10) Patent No.: US 12,128,930 B2
(45) Date of Patent: **\*Oct. 29, 2024**

(54) METHOD AND SYSTEM FOR FORECASTING REACTIONS OF OTHER ROAD USERS IN AUTONOMOUS DRIVING

(71) Applicant: Argo AI, LLC, Pittsburgh, PA (US)

(72) Inventor: Nathaniel Honka, Mountain View, CA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,021

(22) Filed: Aug. 1, 2023

(65) Prior Publication Data

US 2023/0382430 A1 Nov. 30, 2023

Related U.S. Application Data

(63) Continuation of application No. 16/951,416, filed on Nov. 18, 2020, now Pat. No. 11,753,044.

(51) Int. Cl.
*B60W 60/00* (2020.01)
*B60W 50/00* (2006.01)
*G05D 1/00* (2006.01)

(52) U.S. Cl.
CPC .. *B60W 60/00274* (2020.02); *B60W 50/0097* (2013.01); *B60W 60/0011* (2020.02);
(Continued)

(58) Field of Classification Search
CPC .... G06V 20/56; G05D 1/0088; G05D 1/0212; G05D 2201/0213; B60W 2420/42; B60W 2420/52; B60W 30/095; B60W 30/0956; B60W 50/0097; B60W 60/0011; B60W 60/0027; B60W 60/00274;
(Continued)

(56) References Cited

U.S. PATENT DOCUMENTS 9,669,827 B1 6/2017 Ferguson et al.
10,407,035 B1 9/2019 Gadda et al.
(Continued)

OTHER PUBLICATIONS

Yao, Y. et al. "Egocentric Vision-Based Future Vehicle Localization for Intelligent Driving Assistance Systems," arXiv:1809.07408v2 [cs.CV] Mar. 2019.
(Continued)

*Primary Examiner* — Matthew J. Reda
(74) *Attorney, Agent, or Firm* — Fox Rothschild LLP (57) ABSTRACT

System and methods for causing movement of an autonomous vehicle. The methods comprise: determining candidate trajectories of the autonomous vehicle using candidate actions forecasted for a virtual doppelganger and reactive actions predicted for a non-Ego actor that is located in proximity to the autonomous vehicle; selecting first candidate trajectories of the candidate trajectories in which the autonomous vehicle has an influence on a response of the non-Ego actor; using the first candidate trajectories for the autonomous vehicle to refine the reactive actions that were predicted for the non-Ego actor; using the reactive actions that were refined to select one of the first candidate trajectories as a selected trajectory for the autonomous vehicle to follow; and causing an automation subsystem of the autonomous vehicle to move the autonomous vehicle along the selected trajectory.

20 Claims, 5 Drawing Sheets

(52) U.S. Cl.
CPC ......... *G05D 1/0088* (2013.01); *G05D 1/0212* (2013.01); *B60W 2420/403* (2013.01); *B60W 2420/408* (2024.01)

(58) Field of Classification Search
CPC ..... B60W 60/00276; B60W 2420/408; B60W 2420/403
See application file for complete search history.

(56) References Cited

U.S. PATENT DOCUMENTS

| | | |
|---|---|---|
| 2018/0284785 A1 | 10/2018 | Berntorp et al. |
| 2019/0072966 A1 | 3/2019 | Zhang et al. |
| 2019/0152490 A1 | 5/2019 | Lan et al. |
| 2020/0089238 A1 | 3/2020 | McGill, Jr. et al. |

OTHER PUBLICATIONS

Hamlet, A. et al. "The Cognitive Driving Framework: Joint Inference for Collision Prediction and Avoidance in Autonomous Vehicles," 2015 15th International Conference on Control, Automation and Systems (ICCAS 2015), Oct. 2015.

Chang, M.F. et al., "Argoverse: 3D Tracking and Forecasting with Rich Maps," arXiv:1911.02620v1 [cs:CV] Nov. 2019, pp. 1-18.

"Prediction of human's movement for collision avoidance of mobile robot." In 2011 IEEE International Conference on Robotics and Biomimetics, pp. 1633-1638. IEEE, 2011.(Retrieved on Feb. 8, 2022). Retrieved from the Internet: < https://www.researchgate.net/profile/Yusuke-Tamura-2/publication/236268192_Prediction_of_Human's_Movement_for_Collision_Avoidance_of_Mobile_Robot/links/0deec51778f61ae594000000/Prediction-of-Humans-Movement-for-Collision-Avoidance-of-Mobile-Robot.pdf >.

METHOD AND SYSTEM FOR FORECASTING REACTIONS OF OTHER ROAD USERS IN AUTONOMOUS DRIVING

CROSS-REFERENCE TO RELATED APPLICATIONS

The present application claims the benefit of and priority to U.S. patent Ser. No. 16/951,416 which was file don Nov. 18, 2020. The content of this patent application is incorporated herein in its entirety.

BACKGROUND

When an autonomous vehicle (AV) control system makes decisions about how and where to move the vehicle in an environment, a challenging problem is how to plan for possible interactions between the AV and other actors in the environment. The classical approach for considering other actors is to predict the trajectories that the other actor may take. Then, in motion planning, the AV plans to avoid those potential trajectories by treating them as hard obstacles with a certain chance of existing in the future.

However, treating the future actions of other actors as unchanging, hard boundaries to avoid in all situations is not ideal, as it can cause the AV to avoid locations in space and time that the other actor will not actually reach. It can also cause the AV to fail to consider other potential actions of the actor, such as how the actor may react to actions of the AV.

Thus, an important task for AV motion planning is to reason how an ego-vehicle's actions will influence another vehicle's decisions of how to move. However, reasoning about the interaction between AV and other vehicles is inherently computationally complex. An AV must reason about how the other actor might act in the first instant, then how AV might react to that, then how the other actor might react at the next instant to AV's reaction, and so on over the course of the entire near future. The space of possibilities grows exponentially when considering just one actor, and grows even faster when considering the actions of multiple actors; it quickly becomes computationally intractable to reason over the entire space of possibilities expeditiously.

This document describes methods and systems that are directed to addressing the problems described above, and/or other issues.

SUMMARY

In various embodiments, a method of determining a trajectory for an autonomous vehicle includes, by a presence detection subsystem of an autonomous vehicle, detecting another, non-Ego actor. At a time to, an on-board computing system of the autonomous vehicle will generate a virtual doppelganger that is co-located with the autonomous vehicle. The computing system will predict possible modalities for the non-Ego actor and, for each of the modalities, one or more possible trajectories for the other actor. The computing system will forecast candidate actions of the virtual doppelganger, wherein each candidate actions corresponds to one or more of the possible trajectories of the non-Ego actor. The computing system will predict reactive actions of the non-Ego actor, wherein each of the reactive actions is reactive to one of the candidate actions of the virtual doppelganger. The computing system will determine candidate trajectories of the autonomous vehicle, and it will select one of the candidate trajectories as a selected trajectory for the autonomous vehicle to follow. An automation subsystem of the autonomous vehicle will then cause the autonomous vehicle to move along the selected trajectory. Optionally, to select the candidate trajectory, the computing system may use the candidate trajectories for the autonomous vehicle to refine the predicted reactive actions for the other actor, and use the refined reactive actions to select the trajectory for the autonomous vehicle to follow.

In various embodiments, the method also may include scoring the candidate trajectories for the autonomous vehicle according to a level of probability that the non-Ego actor will execute one or more of the refined reactive actions. Selecting one of the candidate trajectories as the selected trajectory for the autonomous vehicle to follow may then include selecting a candidate trajectory having a highest score. Optionally, scoring the candidate trajectories for the autonomous vehicle also factors in, for each candidate trajectory, an estimated value of the candidate trajectory should it be executed, given that the non-Ego actor executes a particular trajectory $T_i$.

In some embodiments, the method also includes determining which of the candidate trajectories is most likely to induce a particular refined reactive trajectory or modality in the non-Ego actor. If so, then selecting one of the candidate trajectories as the selected trajectory for the autonomous vehicle to follow may include selecting the candidate trajectory that is most likely to induce a particular refined trajectory or modality in the other actor.

In some embodiments, forecasting the candidate trajectories of the virtual doppelganger includes identifying candidate trajectories that are statistically correlated with each of the predicted modalities of the non-Ego actor.

In some embodiments, forecasting the candidate trajectories of the virtual doppelganger comprises identifying candidate trajectories that are statistically correlated with one of the accompanying trajectory forecasts for the non-Ego actor for that modality.

In some embodiments, the AV's presence detection subsystem will also detect additional non-Ego actors. In these embodiments, at time $t_o$ the AV's on-board computing system may: (i) predict possible modalities for each additional non-Ego actor to produce a combinatorial set of possible joint modalities of all non-Ego actors; (ii) reduce the set of possible joint modalities to produce a reduced set by, for example, reasoning about which joint modalities are internally consistent across the non-Ego actors; (iii) predict, for each of the modalities in the reduced set, one or more possible trajectories for one or more of the additional non-Ego actors; (iv) forecast additional candidate actions of the virtual doppelganger, wherein each additional candidate actions corresponds to one or more of the possible trajectories of the additional non-Ego actors; (v) predict reactive actions of the additional non-Ego actors, wherein each of the reactive actions is reactive to one of the candidate actions or additional candidate actions of the virtual doppelganger; (vi) determine candidate trajectories of the autonomous vehicle; and (vii) use the candidate trajectories for the autonomous vehicle to refine the predicted reactive actions for one or more of the non-Ego actors.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Definitions for additional terms that are relevant to this document are included at the end of this Detailed Description.

This document describes an approach by which an autonomous vehicle (AV) will predict potential actions of other movers in an environment, and then use the result to make decisions about when and where the AV will move. This document may refer to the AV that makes such decisions as an "ego-vehicle" or by simply using the capitalized term "Ego". This document may refer to the other movers such as vehicles (cars, trucks, bicycles, etc.) and pedestrians as "other actors", as "non-Ego actors", or by simply using the capitalized term "Other".

In this document, the high-level categories of actions that a non-Ego actor Other has are referred to as the "modalities" of its future distribution of states p(Other). Thus for a given object, p(Other) includes multiple modalities. For example, an actor merging with Ego might have p(Other) with two modalities, (1) "yield" and (2) "don't yield", or even three modalities, (1) "yield", (2) "don't yield", and (3) "move to left lane". Note that each modality may itself be composed of many individual possible trajectories that Other may traverse. For example, if Other chooses the "yield" modality, it still has the option to brake hard, brake softly, or something in between.

The prediction actions of this document may be performed by a prediction subsystem of an AV. As will be described in FIG. 4 below, an AV will include an on-board computing system that receives data from various sensors (such as cameras and LiDAR system sensors), processes that data to classify moving actors and other objects, and predicts one or more actions that a detected moving actor may take. A motion planning subsystem of the AV may then use the predictions to select actions that the AV will take in response to the moving actor's action, such as speed up, slow down, turn or move into another lane, etc. The motion planning subsystem may also be incorporated in the AV's on-board computing system, optionally with unique processing and storage components or with shared components (i.e., components may be shared between the prediction and motion planning systems).

For any detected Other, an ego-vehicle's prediction system may generate a set of nominal forecasts p(Other), which is an estimate of the distribution of possible future states of the other actor. Thus, as described above, the motion planning system will use p(Other) to propose actions and select trajectories that reflect those actions. However, as noted in the Background section, Other's actions may be wholly or partially reactive to Ego's actions. Thus, forecasts will be conditional on the actions that Ego takes, and thus may be reflected as p(Other|Ego). Because of this, the number of possible actions that Other may take increases with the number of actions that Ego may take.

Therefore, this document proposes methods by which a vehicle can select actions that Ego can take to influence the action of other, ideally narrowing p(Other|Ego) to be largely distributed over a single modality. This narrowing is termed "modal collapse in p(Other|Ego)".

Figure 1:
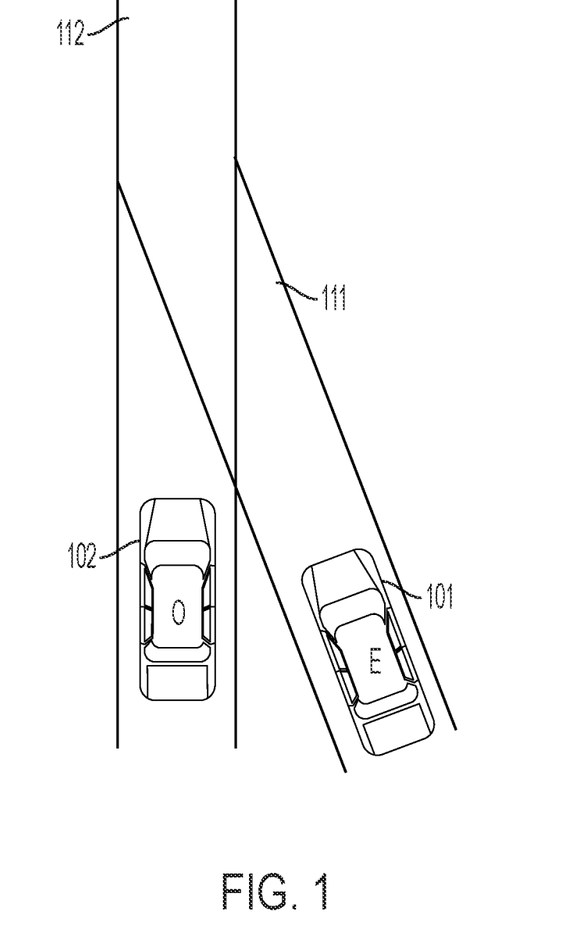
FIG. 1 illustrates an example of an interaction between an autonomous vehicle (AV) and another moving actor in an environment

Consider the example scenario shown in FIG. 1, in which an ego-vehicle 101 is driving along a first lane 111 and is about to merge into a second lane 112. The ego-vehicle's sensors detect a moving actor 102 (in this case, another vehicle) in the second lane 112, moving toward the intersection between the first and second lanes 111, 112. (Methods by which the ego-vehicle's sensor may detect a moving actor will be described below.)

If a human were operating ego-vehicle 101, the human operator would understand that his or her actions would influence the outcome of this scenario. For example, if the ego-vehicle 101 were to accelerate then p(Other|Ego) would shift toward the modality Other=Yield, and if the ego-vehicle 101 were to decelerate then p(Other|Ego) would shift toward the modality Other=No Yield. The human operator knows that its actions will influence Other's actions.

This document describes a method in which a vehicle operating in an autonomous mode may select actions for the Ego that will influence a desired action in Other, thus helping Ego more efficiently develop and analyze the joint distribution of actions p(Other, Ego), the distributions of joint outcomes that may occur as Other and Ego interact.

The system does this by generating a "virtual Ego," referred to in this document as a "virtual doppelganger" or $Ego_{doppelganger}$, which is a virtual representation of a vehicle that is located where Ego currently is at a given point in time to and which has Ego's pose history for a set of times prior to and leading up to the present time ($t <= t_0$), but instead behaves in a manner that matches non-Ego actors with similar characteristics. That is, $Ego_{doppelganger}$ does not behave like Ego, but instead behaves like non-Ego actors in the same situation.

Figure 2:
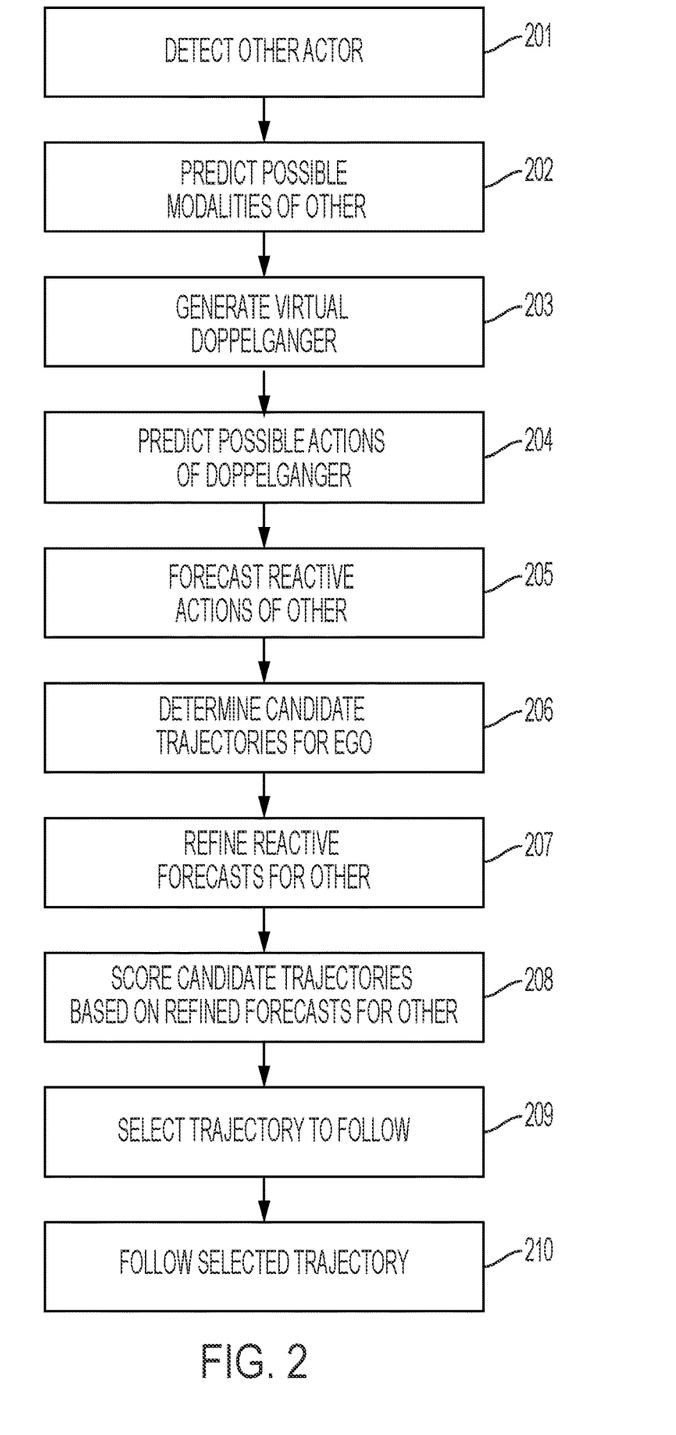
FIG. 2 is a flowchart illustrating example steps of an algorithm for forecasting an action of another vehicle in reaction to various actions that an ego-vehicle may take, and then using those forecasts to select an action for the ego-vehicle.

FIG. 2 illustrates an algorithm by which an on-board computing system of an AV (Ego) may implement this prediction function. At 201 the presence detection system of Ego will detect the presence of another actor (Other) and identify that Other may intersect a planned path of Ego. A presence detection system will include one more or more sensors that capture data about other objects and actors in the environment, and processors and programming instructions configured to analyze that data and classify actors and objects that are identified. For example, the presence detection system may capture images of the moving actor and process the images using a classifier (i.e., a trained model) to identify the presence of an object and classify the object as a vehicle, bicycle, pedestrian or other moving actor. Other presence detection system elements such as LiDAR sensors may be employed. The presence detection system may use any now or hereafter known object recognition algorithms, video tracking algorithms, and computer vision algorithms to identify the moving actor. For example, the system may use a bounding box to identify an object in a first frame and track movement of the box frame-to-frame iteratively over a time period.

At 202 Ego's prediction subsystem may predict possible action classes of Other by selecting a set of any number of modalities $M_O=[M_{O,1}, M_{O,2}, \ldots M_{O,N}]$ for Other. For example, referring to the example of FIG. 1, the prediction subsystem may identify two modalities [yield/no yield]. Example results may be $p(M_O=[yield: 0.3/no yield: 0.7]$. Note that a modality as here defined is not an explicit single trajectory, but a class of trajectories, of which Other will select one, as yet unknown to Ego, in the future. The system may select the predicted modalities using any possible algorithm, such as a lookup table, rule set, or trained model that relates possible modalities to detected road conditions and other actor actions. Since Ego's future trajectory is as of yet undefined, the predicted modalities for Other implicitly account for all reasonably possible future trajectories of Ego, to which Other might react.

By way of example, the system may use a parameterized motion model that is a longitudinal model to predict a set of possible reaction of the moving actor to the AV. Just as the ego-vehicle has a choice of whether to accelerate or decelerate before merging, the moving actor has the choice of whether to accelerate and pass the ego-vehicle or slow and queue behind it. Thus, the moving actor may have a choice between several possible reactive modalities. The ego-vehicle's motion planning system may therefore assume that the mover is behaving optimally or rationally with respect to some cost function, and that when faced with a choice (such as accelerate and pass, or slow and queue behind) the moving actor may choose a modality from n modalities having a relatively lower cost than others. For example, a moving actor may yield 70% of the time but not yield 30% of the time. Thus, the system may determine a probability distribution of any number of n modalities, each of which has an associated probability. Using the example results above, the ego-vehicle may presume that the other actor will yield 70% of the time, and that the other actor will not yield 30% of the time.

At 203 Ego's prediction system will generate a virtual doppelganger $Ego_{doppelganger}$ and at 204 generate, for each modality $M_{O,i}$ in p(Other), a prediction of one or more actions that the virtual doppelganger is likely to have taken given the assumption that Other will have, in the end, executed some trajectory from modality $M_{O,i}$. This may be represented as $p(Ego_{doppelganger}|Other=M_{O,i})$ for each modality $M_{O,i}$ in p(Other). This is not necessarily a reaction to Other's trajectory, but a function of the statistical correlation between their joint outcomes. For example, referring again to FIG. 1, if Other 102 is known to have eventually yielded to Ego, the maximum likelihood trajectory that the virtual doppelganger will have traversed will be one that has proceeded into lane 112 ahead of Other. On the other hand, if Other 102 is known to have not yielded, the maximum likelihood trajectory that the virtual doppelganger will have traversed will be to have slowed down and remained in lane 111 until other 102 had passed. The system does this using prediction methods and models conditioned on the assumed outcome $M_{O,i}$ for Other, determining the action that the virtual doppelganger is mostly likely to have taken given what the system knows about what other vehicles have done in similar situations where Other ended up in modality $M_{O,i}$ at the conclusion of the interaction.

By way of example, the system may deliver (1) the trajectory history of all objects in the scene, including Ego, and (2) an assumed modality for Other $M_{O,i}$ chosen from p(Other) as inputs to a deep neural network model which has been trained with historical data from many similar interactions. The neural network may predict a single virtual-Ego maximum-likelihood trajectory $T_{doppelganger}$ for each $M_{O,i}$. This trajectory would represent the most likely thing, on the condition that Other ended up at $M_{O,i}$, that other vehicles in Ego's situation have done.

Returning to FIG. 2, at 205 Ego's prediction subsystem will again predict possible actions of Other, except in this step the predictions will be reactive forecasts to the possible actions of the virtual doppelganger, i.e., $p(Other|Ego_{doppelganger}=T_{i, doppelganger})$ for each doppelganger trajectory $T_{i, doppelganger}$. The system will therefore forecast a set of trajectories $F=(f1, f_2, \ldots f_{3j})$ for each modality $M_{O,i}$. The $j^{th}$ forecast of the $i^{th}$ modality $M_{O,i}$ is hereafter denoted $F_{i,j}$. Techniques for forecasting an actor's trajectory are well known in the art, and any known or to be known technique for determining an actor's trajectory can be used. Example trajectory forecasting algorithms are disclosed in, for example, Chang et al. "Argoverse: 3D tracking and Forecasting with Rich Maps", published Nov. 6, 2019 at https://arxiv.org/abs/1911.02620, and include algorithms such as Social-LSTM, Social-GAN, IntentNet, DESIRE, R2P2 and PRECOG, among other algorithms. These algorithms may, in some embodiments, also consider as an input past actions of the ego-vehicle to predict the trajectory for the moving actor. For example, if the ego-vehicle's past actions demonstrate an intent to move into the path of the moving actor, the trajectory of the moving vehicle may be in part reactive to the moving actor's expected action of the ego-vehicle.

Figure 3A:
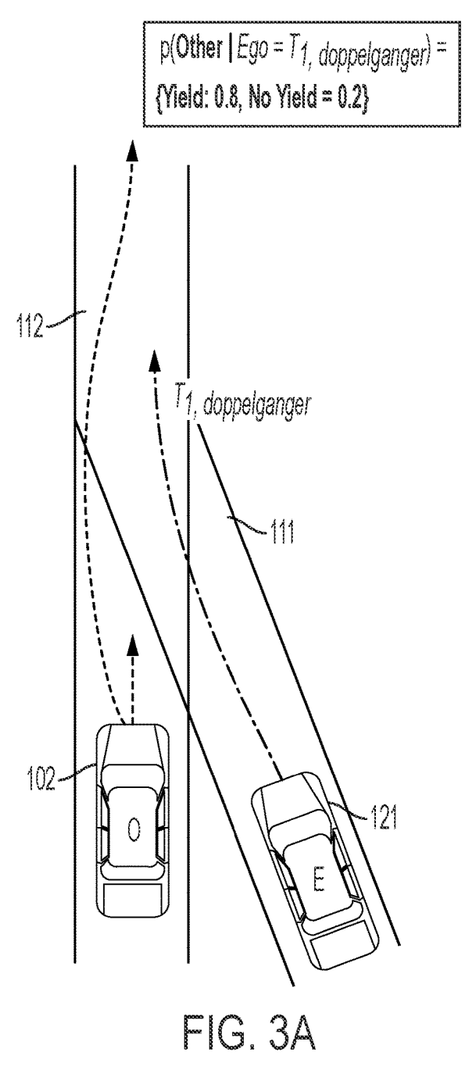
FIGS. 3A and 3B illustrate how a system may use potential actions of a virtual doppelganger to forecast reactive trajectories for another actor.
Figure 3B:
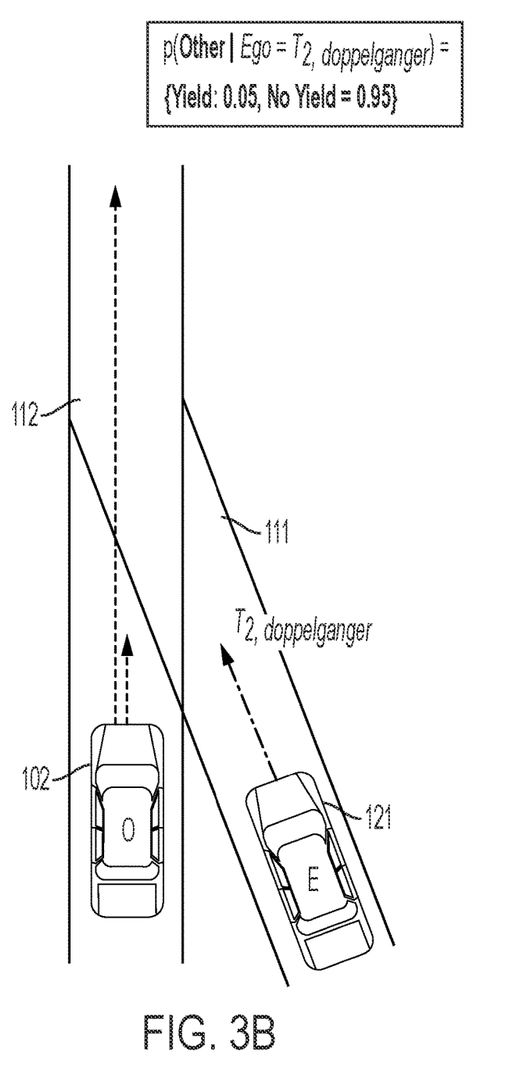

For example, referring to FIG. 3A, if the virtual doppelganger 121 follows trajectory $T_1$ and merges into lane 112 ahead of Other 102, the probability that Other 102 will yield may be 0.8, and the probability that Other will swerve but not yield may be 0.2. Referring to FIG. 3B, if the virtual doppelganger 121 follows trajectory $T_2$ slows and remains in lane 111, the probability that Other 102 will yield may be only 0.05, while the probability that Other will proceed along lane 112 may be 0.95.

By way of example, the system may deliver (1) the trajectory history of all objects in the scene, including Ego, and (2) an assumed modality for Other $M_{O,i}$ chosen from p(Other) to a deep neural network model which has been trained with historical data from many similar interactions. The neural network may predict a single virtual-Ego maximum-likelihood trajectory $T_{doppelganger}$ for each $M_{O,i}$. This trajectory would represent the most likely thing, on the condition that Other ended up at $M_{O,i}$, that other vehicles in Ego's situation have done.

By way of example, the system may deliver (1) the trajectory history of all objects in the scene, including Ego, and (2) an assumed modality for Other $M_{O,i}$ chosen from p(Other) to a deep neural network model which has been trained with historical data from many similar interactions. The neural network may predict a single virtual-Ego maximum-likelihood trajectory $T_{doppelganger}$ for each $M_{O,i}$. This trajectory would represent the most likely thing, on the condition that Other ended up at $M_{O,i}$, that other vehicles in Ego's situation have done Returning to FIG. 2, knowing what the system learned in steps 204 and 205, at 206 the system will then determine any number of candidate trajectories for the ego-vehicle. This determination may be performed by a trajectory generator module, which may be implemented as programming instructions in the AV's prediction subsystem, in the AV's motion planning subsystem, or in a separate trajectory generation subsystem. Each candidate trajectory will include a path and corresponding time elements by which the ego-vehicle will reach a target location from its present location. In generating a candidate trajectory, the ego-vehicle's motion planning may consider map data, detected objects, traffic signals and detected traffic signal states, or other aspects of the environment. For example, to determine a candidate trajectory the system may determine which lanes are available for the ego-vehicle to reach a destination. Each such lane may be considered to be a path along which the trajectory will follow. The system may then apply various speeds to each path to select candidate trajectories, some of which reach the target relatively quicker, and some relatively slower, than others.

The system may refine or limit its set of candidate trajectories considering what it learned in previous steps, in particular $p(\text{Ego}_{doppelganger}|\text{Other}=M_{O,i})$ of step 204 and $p(\text{Other}|\text{Ego}_{doppelganger}=T_{i,\ doppelganger})$ of step 205. For example, a scenario such as that described above in the context of FIGS. 3A and 3B shows that Ego's action can significantly influence the outcome of the scenario and influence how certain Ego is regarding Other's response to Ego's action. If Ego selects trajectory $T_2$ as shown in FIG. 3B then Ego has near certainty regarding the action that Other will take, since the most likely modality $M_O$(No Yield) has likelihood 0.95. Conversely, if Ego were to select trajectory $T_1$ as in FIG. 3A, Other's action is less certain since the most likely modality $M_O$(Yield) only has likelihood 0.8. Thus, the system may select as a candidate trajectory for Ego the trajectory in which Ego will have greater influence on the scenario's outcome, thus reducing uncertainty. The system may also select a trajectories similar to any of $T_{i,\ doppelganger}$ and infer that the likelihoods for Other's actions will be similar. The system may repeat this for multiple modalities, thus yielding a set of candidate trajectories having a relatively low uncertainty with respect to Other's action, eliminating candidate trajectories that result in more uncertain outcomes. Thus Ego may understand which candidate trajectories are likely to induce modal collapse in p(Other|Ego). The system may still select candidate trajectory that does not induce modal collapse if other factors make it an important trajectory for AV to consider. For example, referring again to FIGS. 3A and 3B, the system may determine that a merging trajectory similar to 121 should always be considered, regardless of how likely it is to induce modal collapse in p(Other|Ego), since the benefits of merging right now may outweigh the uncertainty the success of attempting to merge.

At 207 the prediction subsystem may refine the reactive forecasts of the other actor with actual (not just virtual) proposed trajectories $p(\text{Other}|\text{Ego}=T_{TG,\ i})$. The system will do this in the same manner that it originally determined reactive actions for Other in step 205, except that in step 207 the system will consider at least some of the candidate trajectories for Ego as determined in step 206, in addition to or instead of possible trajectories for a doppelganger.

Once the system has a set of refined forecasts of reactive actions of Other for each candidate trajectory, at 208 it will score the candidate trajectories based on their likelihood to influence outcomes in a scenario and the various benefits of those outcomes, or based on other factors. For example, the system may score any given trajectory $T_{TG}$ according to an its expected value $V(T_{TG})$ in which:

$$V(T_{TG})=\text{sum}\_[i][p(\text{Other})=T_{Other,i}|\text{Ego}=T_{TG})*(V(T_{TG}, T_{Other})]$$

Which may be read as the sum, over all Other forecasts, of the (probability P(other) that Other executes forecast i ($T_i$) given that Ego executes $T_{TG}$")*(value of Ego executing $T_{TG}$ given that Other executes $T_i$).

At 209 the system may then use the scores to select a candidate trajectory to follow using any suitable rule set. For example, the system may select the candidate trajectory having the highest score. Alternatively, the system may select a trajectory that is most likely to influence the other actor to take a particular action. Other factors, or combinations of factors, may be considered in the selection process.

Figure 5:
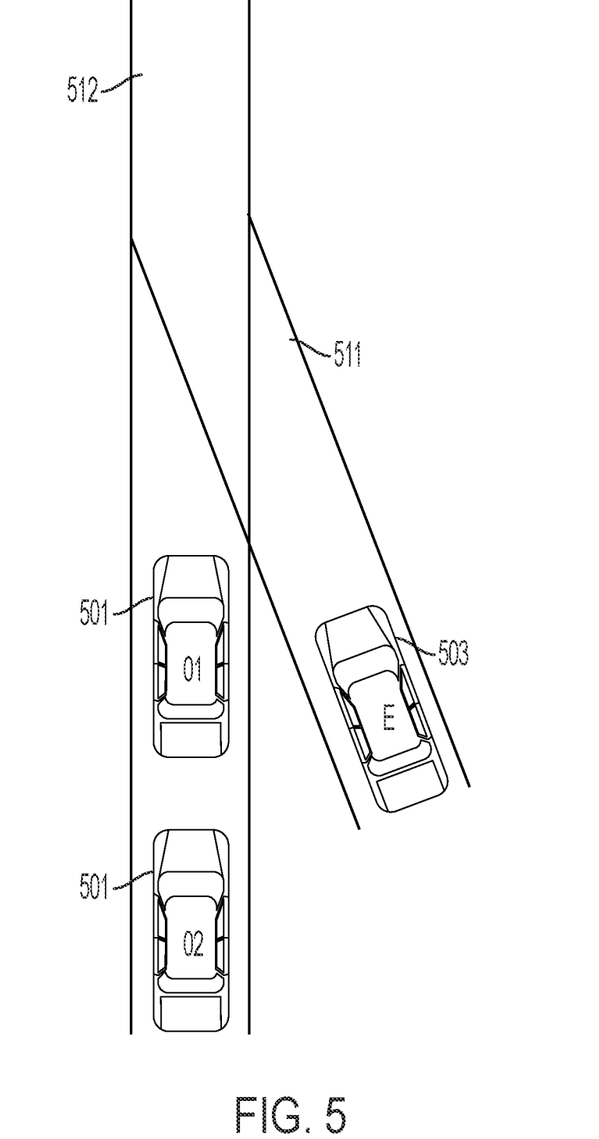
FIG. 5 illustrates an example of an interaction between an AV and multiple moving actors in an environment.

Although the description above describes a simple example in which the system predicts modalities and forecasts trajectories of a single other actor, in many scenarios an AV may encounter multiple other actors and will need to consider potential modalities and derived trajectories of multiple non-Ego actors in motion planning. In these situations, the system may predict a number of n modalities for each of a number of m actors (as in step 202 above) to produce and then consider a combinatorial set of potential nm joint modalities of the entire group of other actors. For example, an intersecting street such as that shown in FIG. 1 may include multiple vehicles in a row, each of which must be considered and each of which may yield or not yield to Ego. This is illustrated by way of example in FIG. 5, in which an ego-vehicle 503 is driving along a first lane 511 and is about to merge into a second lane 512. The ego-vehicle's sensors detect two moving actors (vehicles O1 501 and O2 502) in the second lane 512, moving toward the intersection between the first and second lanes 511, 512.) In a scenario such as this, the system may consider all potential combinations of the individual actors' actions, such as Other O1 501 yielding while Other O2 502 does not simultaneously yield. The system may then reduce that combinatorial set to include only those joint modalities that are most likely, such as by eliminating those that would result in a traffic violation or unsafe condition by one or more of the other actors. The system may further reduce that set to include only those joint modalities that are internally consistent across actors, such as by removing those where one actor does not yield at an intersection but the actor directly preceding it does. This can help reduce the number of circulations required for trajectory selection by "pruning" other actor trajectories that are extremely unlikely, or which can be rendered unlikely by an action of the AV. The system will then generate virtual doppelganger trajectories for each modality remaining in the set, and generate reactive trajectories for each of the other actors for each of the virtual doppelganger trajectories. The system may therefore consider all other actors in parallel.

At 210 an automation subsystem of the ego-vehicle may then cause the ego-vehicle to move along the selected trajectory. For example, the selected trajectory will have a particular path, and a speed at each point in the path. The autonomous vehicle system will cause the vehicle's steering system to direct the vehicle along the path, and the vehicle's acceleration or braking subsystems to move the ego-vehicle at the trajectory' speed at each point of the path. Elements of an AV that may implement these actions will be discussed below in the context of FIG. 4.

Figure 4:
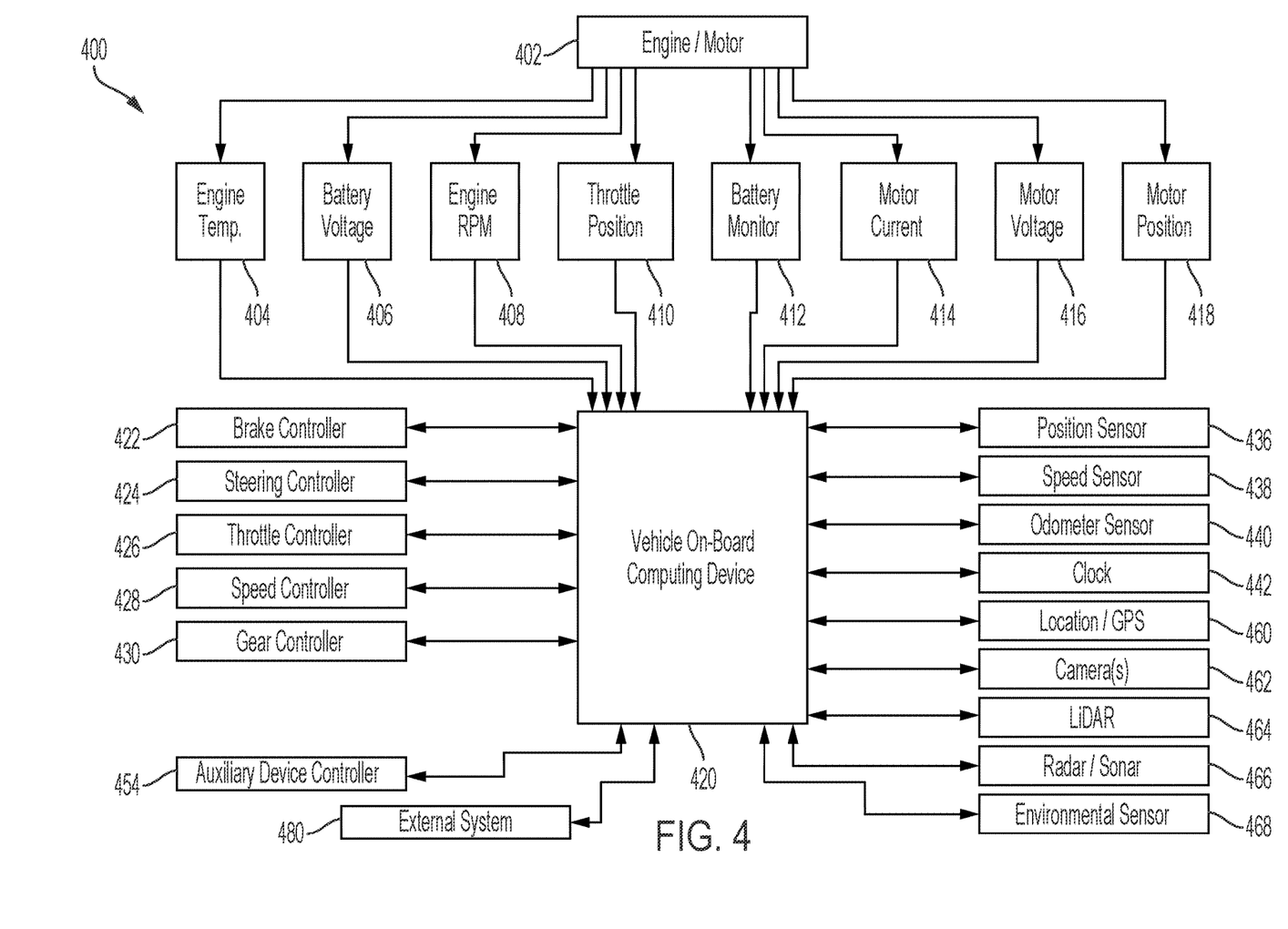
FIG. 4 illustrates example systems and components of an AV.

FIG. 4 illustrates an example system architecture 499 for a vehicle, such as an AV that is an ego-vehicle in the present embodiments. Thus, the following discussion of system architecture 499 is sufficient for understanding ego-vehicle 101 of FIG. 1.

As shown in FIG. 4, the vehicle includes an engine or motor 402 and various sensors 404-418 for measuring various parameters of the vehicle. In gas-powered or hybrid vehicles having a fuel-powered engine, the sensors may include, for example, an engine temperature sensor 404, a battery voltage sensor 406, an engine rotations per minute (RPM) sensor 408, and a throttle position sensor 410. If the vehicle is an electric or hybrid vehicle, then the vehicle may have an electric motor, and accordingly will have sensors such as a battery monitoring system 412 (to measure current, voltage and/or temperature of the battery), motor current 414 and temperature 416 sensors, and motor position sensors such as resolvers and encoders 418.

Operational parameter sensors that are common to both types of vehicles include, for example: a position sensor 436 such as an accelerometer, gyroscope and/or inertial measurement unit; a speed sensor 438; and an odometer sensor 440. The vehicle also may have a clock 442 that the system uses to determine vehicle time during operation. The clock 442 may be encoded into the vehicle on-board computing device, it may be a separate device, or multiple clocks may be available.

The vehicle also will include various sensors that operate as a presence detection system to gather information about the environment in which the vehicle is positioned. These sensors may include, for example: a location sensor 460 (e.g., a global positioning system (GPS) device); object detection sensors such as one or more cameras 462; a LiDAR sensor system 464; and/or a radar and or and/or a sonar system 466. The sensors also may include environmental sensors 468 such as a precipitation sensor and/or ambient temperature sensor. The object detection sensors may enable the vehicle to detect objects (such as moving actor 102 of FIG. 1) that are within a given distance range of the vehicle 400 in any direction, while the environmental sensors collect data about environmental conditions within the vehicle's area of travel.

During operations, information is communicated from the sensors to an on-board computing device 420. The on-board computing device 420 also functions as part of the presence detection system to analyze the data captured by the sensors and optionally control operations of the vehicle based on results of the analysis, as well as an automation subsystem that causes the vehicle to move. The on-board computing device will include one or more processors and one or more memory devices.

For example, the on-board computing device 420 may include programming that is configured to cause the processor to control braking via a brake controller 422; direction via a steering controller 424; speed and acceleration via a throttle controller 426 (in a gas-powered vehicle) or a motor speed controller 428 (such as a current level controller in an electric vehicle); a differential gear controller 430 (in vehicles with transmissions); and/or other controllers.

Geographic location information may be communicated from the location sensor 460 to the on-board computing device 420, which may then access a map of the environment that corresponds to the location information to determine known fixed features of the environment such as streets, buildings, stop signs and/or stop/go signals. Captured images from the cameras 462 and/or object detection information captured from sensors such as LiDAR 464 is communicated from those sensors to the on-board computing device 420, with such elements being elements of a presence detection system of the vehicle. The object detection information and/or captured images are processed by the on-board computing device 420 to detect objects in proximity to the vehicle 400. Any known or to be known technique for making an object detection based on sensor data and/or captured images can be used in the embodiments disclosed in this document In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decisionmaking and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations discussed above. The methods described above improve computational efficiency in trajectory selection. In traditional AV control systems, the prediction subsystems generates many forecasts for other actors without considering any specific action of Ego. Thus, a traditional system generates a large number of Other forecasts that are only marginally likely to be true, given that the other actor would likely not do certain things when Other sees what Ego is doing. Some systems may try to address this by determine how does Ego induce a given action in Other, but that is also computationally intense since all potential actions of Ego must be considered. The methods of this document use Doppelganger forecasts to solve the problem more directly by first determining a likely action in Other, then determining how Ego may help cause that action. When deployed in concert, the methods of this document inherently reason over p(Other, Ego), thus reducing or eliminating the need to explicitly model and sample all of p(Other, Ego) by some other method, a likewise computationally expensive task given the current state of the art.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" or "AV" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

The term "ego-vehicle" refers to a particular vehicle that is moving in an environment. When used in this document, the term "ego-vehicle" generally refers to an AV that is moving in an environment, with an autonomous vehicle control system (AVS) that is programmed to make decisions about where the AV will or will not move.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway, and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when relative terms of order such as "first" and "second" are used to modify a noun, such use is simply intended to distinguish one item from another, and is not intended to require a sequential order unless specifically stated.

The invention claimed is:

1. A method for causing movement of an autonomous vehicle, comprising:
   determining candidate trajectories of the autonomous vehicle using candidate actions forecasted for a virtual doppelganger that is co-located with the autonomous vehicle and reactive actions predicted for a non-Ego actor that is located in sensor range to the autonomous vehicle;
   selecting first candidate trajectories of the candidate trajectories in which the autonomous vehicle has an influence on a response of the non-Ego actor;
   using the first candidate trajectories for the autonomous vehicle to refine the reactive actions that were predicted for the non-Ego actor;
   using the reactive actions that were refined to select one of the first candidate trajectories as a selected trajectory for the autonomous vehicle to follow; and
   causing an automation subsystem of the autonomous vehicle to move the autonomous vehicle along the selected trajectory.

2. The method according to claim 1, further comprising scoring the candidate trajectories of the autonomous vehicle based on a level of probability that the non-Ego actor will execute one or more of the reactive actions that were refined.

3. The method according to claim 2, wherein the selected trajectory for the autonomous vehicle comprises a candidate trajectory having a highest score.

4. The method according to claim 2, wherein said scoring is further based on an estimated value of the candidate trajectory should it be executed, given that the non-Ego actor executes a particular trajectory.

5. The method according to claim 1, wherein each of the candidate actions forecasted for the virtual doppelganger corresponds to a possible modality of a plurality of possible modalities predicted for the non-Ego actor and is based on at least one possible trajectory for the non-Ego actor.

6. The method according claim 5, wherein the plurality of possible modalities comprise high-level categories of actions, at least some of which are associated with a plurality of possible trajectories.

7. The method according to claim 1, wherein each of the reactive actions predicted for a non-Ego actor is reactive to one of the candidate actions forecasted for the virtual doppelganger.

8. A system, comprising:
   a processor;
   a non-transitory computer-readable storage medium comprising programming instructions that are configured to cause the processor to implement a method for managing data, wherein the programming instructions comprise instructions to:
   determine candidate trajectories of the autonomous vehicle using candidate actions forecasted for a virtual doppelganger that is co-located with the autonomous vehicle and reactive actions predicted for a non-Ego actor that is located in sensor range to the autonomous vehicle;
   select first candidate trajectories of the candidate trajectories in which the autonomous vehicle has an influence on a response of the non-Ego actor;
   use the first candidate trajectories for the autonomous vehicle to refine the reactive actions that were predicted for the non-Ego actor;
   use the reactive actions that were refined to select one of the first candidate trajectories as a selected trajectory for the autonomous vehicle to follow; and
   cause an automation subsystem of the autonomous vehicle to move the autonomous vehicle along the selected trajectory.

9. The system according to claim 8, wherein the programming instructions further comprise instructions to score the candidate trajectories of the autonomous vehicle based on a level of probability that the non-Ego actor will execute one or more of the reactive actions that were refined.

10. The system according to claim 9, wherein the selected trajectory for the autonomous vehicle comprises a candidate trajectory having a highest score.

11. The system according to claim 9, wherein said scoring is further based on an estimated value of the candidate trajectory should it be executed, given that the non-Ego actor executes a particular trajectory.

12. The system according to claim 8, wherein each of the candidate actions forecasted for the virtual doppelganger corresponds to a possible modality of a plurality of possible modalities predicted for the non-Ego actor and is based on at least one possible trajectory for the non-Ego actor.

13. The system according claim 12, wherein the plurality of possible modalities comprise high-level categories of actions, at least some of which are associated with a plurality of possible trajectories.

14. The system according to claim 8, wherein each of the reactive actions predicted for a non-Ego actor is reactive to one of the candidate actions forecasted for the virtual doppelganger.

15. A non-transitory computer-readable medium that stores instructions that, when executed by at least one computing device, will cause the at least one computing device to perform operations comprising:
   determining candidate trajectories of the autonomous vehicle using candidate actions forecasted for a virtual doppelganger that is co-located with the autonomous vehicle and reactive actions predicted for a non-Ego actor that is located in sensor range to the autonomous vehicle;
   selecting first candidate trajectories of the candidate trajectories in which the autonomous vehicle has an influence on a response of the non-Ego actor;
   using the first candidate trajectories for the autonomous vehicle to refine the reactive actions that were predicted for the non-Ego actor;
   using the reactive actions that were refined to select one of the first candidate trajectories as a selected trajectory for the autonomous vehicle to follow; and
   causing an automation subsystem of the autonomous vehicle to move the autonomous vehicle along the selected trajectory.

16. The non-transitory computer-readable medium according to claim 15, wherein the at least one computing device is further caused to score the candidate trajectories of the autonomous vehicle based on a level of probability that the non-Ego actor will execute one or more of the reactive actions that were refined.

17. The non-transitory computer-readable medium according to claim 16, wherein the selected trajectory for the autonomous vehicle comprises a candidate trajectory having a highest score.

18. The non-transitory computer-readable medium according to claim 16, wherein said candidate trajectories are scored further based on an estimated value of the candidate trajectory should it be executed, given that the non-Ego actor executes a particular trajectory.

19. The non-transitory computer-readable medium according to claim 15, wherein each of the candidate actions forecasted for the virtual doppelganger corresponds to a possible modality of a plurality of possible modalities predicted for the non-Ego actor and is based on at least one possible trajectory for the non-Ego actor.

20. The non-transitory computer-readable medium according claim 19, wherein the plurality of possible modalities comprise high-level categories of actions, at least some of which are associated with a plurality of possible trajectories.

* * * * *